Nov. 6, 1928.   
E. W. SEAHOLM ET AL   
1,690,347
COMBINED TIRE CARRIER AND LAMP DEVICE FOR AUTOMOBILES
Filed Jan. 11, 1924   2 Sheets-Sheet 1
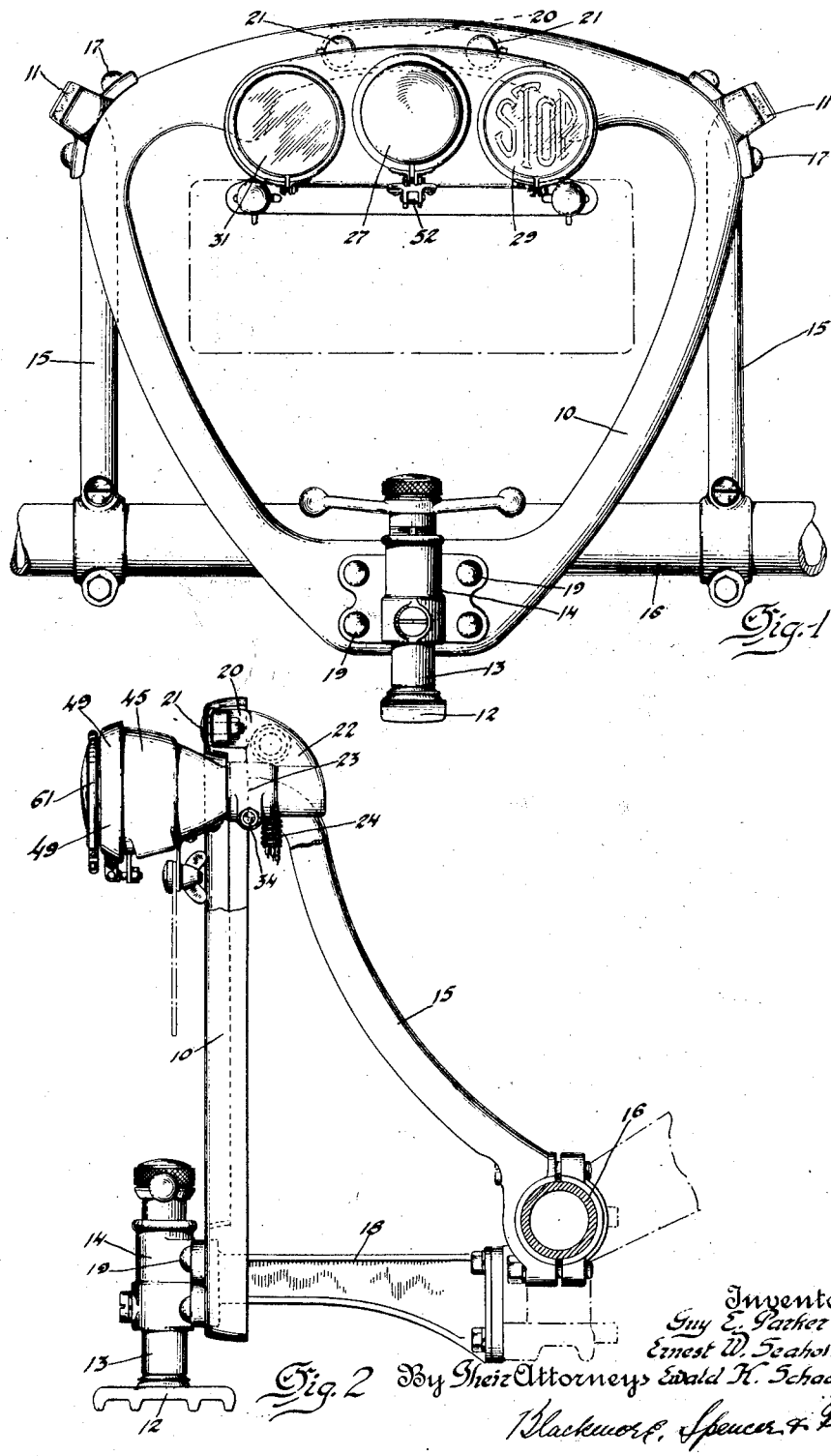

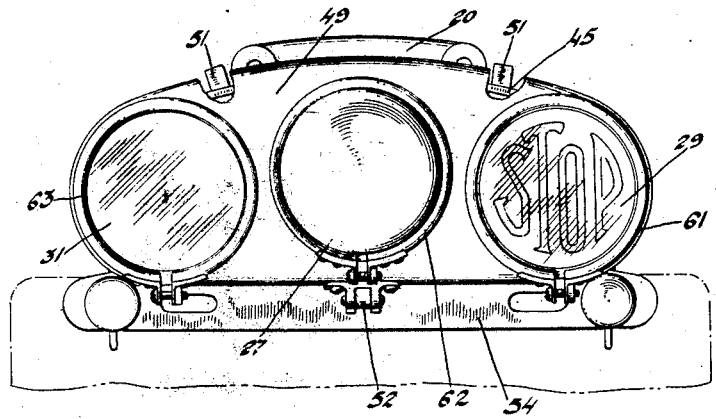
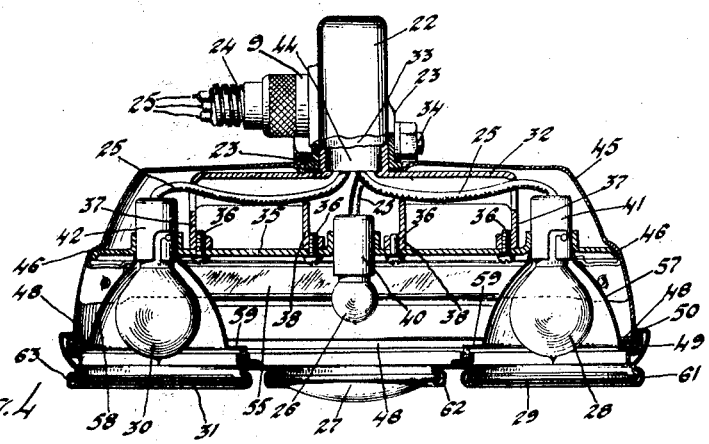
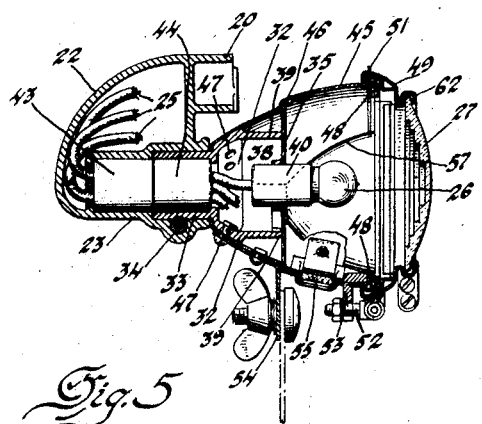

Patented Nov. 6, 1928.

1,690,347

UNITED STATES PATENT OFFICE.

ERNEST W. SEAHOLM, OF HIGHLAND PARK, AND GUY E. PARKER AND EWALD K. SCHADT, OF DETROIT, MICHIGAN, ASSIGNORS TO GENERAL MOTORS CORPORATION, OF DETROIT, MICHIGAN, A CORPORATION OF DELAWARE.

COMBINED TIRE CARRIER AND LAMP DEVICE FOR AUTOMOBILES.

Application filed January 11, 1924. Serial No. 685,690.

Our invention relates to lamp devices or structures designed especially for use in connection with and at the rear ends of motor driven vehicles, and particularly to lamp devices wherein a plurality of lamps adapted for use as signals having various meanings are built into a single lamp structure and housed within one and the same external casing thereof to thereby form a unitary lamp structure or device.

The object of our invention is to provide various improvements in and relating to lamp devices of the type, class or kind above referred to, all as will hereinafter and at length appear.

The drawings accompanying this specification and forming a part thereof illustrate the preferred embodiment of our invention; although the same may be embodied in various other forms all included in our invention and in the patent to be secured therefor, so long as such other forms come within the scope of the concluding claims wherein the distinguishing features wherein our invention consists are particularly pointed out.

In the drawings comprising two sheets having five figures in all:

Figure 1 is a view showing a rear end tire carrier of a type in extensive use, together with our improved lamp structure supported by and from the carrier; all as seen from a position to the rear of a vehicle equipped with said parts.

Figure 2 is a view showing the parts shown in Figure 1 in side elevation for the most part.

Figure 3 is a view showing our improved lamp by itself, and upon a larger scale and in end elevation.

Figure 4 is a view showing a section of our improved lamp structure or device upon a horizontal approximately central plane.

Figure 5 is a view showing a section of our invention upon a vertical longitudinally extending central plane.

Referring now to the drawings wherein like parts are designated by the same reference numerals in the several views, the reference numeral 10 designates the internal bracing and ring like member of a tire carrier which element lies within the area enclosed by a demountable rim, supported by the carrier, and having a tire thereupon; the rim being engaged at three points within the same by bearings 11, 11 at the top, and 12 at the bottom thereof; the latter member being secured to the lower end of a plunger 13 which is movable up and down in a bearing member 14 by a screw and nut device not disclosed in detail, as the tire carrier features per se of the device are not involved in the invention to which this present application relates. The bearings 11 and 12 are ordinarily long enough to engage the interiors of and to support two rims with tires thereupon; and suitable locking means may be associated with the plunger 13 and the operating mechanism therefor for locking the parts against rotation, to thereby prevent unauthorized removal of the rims and tires after the lower bearing 12 has been forced into engagement with the rim or rims. The bearings 11, 11 are usually formed integrally with arms 15 extending upwardly and rearwardly from a tubular cross member 16 at the rear end of the vehicle frame and the upper ends of which are fastened to the ring 10 by rivets 17, or otherwise; while the bearing member 14 is fastened to the rear end of an arm 18 which extends rearward from a centrally located cross spring perch fastened to the cross member 16. The ring member 10 is shown as substantially triangular in form and as substantially U-shaped in cross section, and as formed from a suitably shaped sheet metal blank by the use of suitable dies, as will be understood. A portion of the wall of this ring member at the lower end thereof is shown as lying between the bearing member 14 and the end of the arm 18; the said member being secured to the end of the arm with the ring wall between them by rivets 19, or otherwise, as will be appreciated.

Supported from the upper substantially horizontal part of the ring like member 10 is a hollow lamp bracket or support having an upper base portion 20 fitting within the ring 10 and secured thereto by suitable fastenings 21, a depending portion 22 merging at its lower end with a substantially horizontal tubular socket or barrel portion 23 circular in cross section and disposed below the upper horizontal part of the ring 10 (from which the lamp structure in its entirety is supported through the bracket aforesaid), and a laterally arranged inlet neck or flange 9 for facilitating the attachment to the said lamp supporting bracket of the supply cable 24 through which the several conducting wires 25 whereby electricity is supplied to the lamps extend into said hollow supporting bracket, and from the interior thereof through said socket and to the several individual lamps of the lamp structure regarded in its entirety. In the particular embodiment of our invention illustrated there is a middle lamp 26 which shines through a red lens 27 and forms the regular tail light of the vehicle, a side lamp 28 which illuminates a transparent screen 29 adapted when illuminated by the said lamp to display the word "Stop," or other signal indicating an intent on the part of the driver of the vehicle, and a third side lamp 30 which shines through a preferably clear plate or lens 31 when the vehicle is to move backward, to thereby give notice of an intent of the driver to back the vehicle and at the same time illuminate the roadway in the rear of the vehicle so that the driver may better maneuver the same in backing. The several parts 27, 29 and 31 are supported in openings in a cover 49 to be hereinafter more particularly described and, being transparent members in the nature of the lenses may be properly designated by that term, although ordinarily the central member 27 only is in fact a true lens.

Suitable switching mechanism which forms no part of the invention to which this present application relates will as a matter of course be employed to supply electricity to the central lamp when the vehicle is running ahead at its normal rate; and for supplying current to the side lamps (at which times the central lamp may either remain lighted or may be extinguished) when the operator is about to stop or to slow up, or when he proposes to back the vehicle; all as will be understood by those skilled in the art to which our invention relates.

The numeral 32 designates an oblong box-like or hollow main supporting frame structure having a central tubular neck 33 which fits within the outer portion of the barrel 23, and is held therein by a key in the form of a transverely extending bolt 34 lying in registering grooves in said members; and 35 designates a lamp supporting plate secured to the outer open side of the frame 32 as by means of screws 36 extending into flanges of said frame in the form of our invention illustrated, the plane of the plate being substantially at right angles to the axis of the neck 33 and the barrel 23 in which it fits, as shown in the drawings; and the frame and plate forming a lamp supporting structure whereby the several lamps aforesaid are properly supported in the lamp structure regarded in its entirety. The frame is shown as made up of or having transverse end walls 37 and intermediate walls or webs 38 extending between the side walls 39 extending along the top and bottom thereof; and the said walls 37 and 38 are provided with openings through which the wires 25 pass to the several lamps, all as best shown in Figures 4 and 5 of the drawings.

The lamp carrying plate 35 is provided with openings having surrounding flanges whereby tubular supports are provided for the sockets 40, 41 and 42 which support the lamps 26, 28 and 30, and to which sockets the several supply conductors 25 lead. These sockets may be of the grounded type or variety, in which case the conductors 25 are single wires; or closed circuits may be provided in which case each supply conductor includes two wires to provide a complete circuit for the lamp which it supplies. The supply conductors are shown as interrupted or discontinuous; the portions of said conductors inside the hollow lamp bracket ending in a connector 43 which is held in place within the inner portion of the barrel 23, while the parts inside the frame 32 end in a connector 44 likewise held in place in the neck 33. These connectors have registering end terminals which contact to complete the circuits formed by the conductors 25 when the parts are assembled in the manner illustrated in the drawings, and at the same time permit the entire lamp structure to be removed from the lamp supporting bracket be removing the bolt 34 and moving said structure to the right, referring to Figure 5.

The supporting frame 32, the lamp supporting plate 35 and the lamps 26, 28 and 30 supported by said plate are enclosed in an external casing 45 of suitable form to contain said parts, and which casing extends rearward beyond said plate so as to provide a lamp chamber to the rear thereof within which said lamps are located; said casing and said parts being held in proper position relative to one another by engagement between the periphery of the lamp supporting plate and the interior of the casing, at 46, and by fastening the casing and the main supporting frame together at or dajacent the neck 33, as by rivets 47. Extending about the open side of this casing is an inturned flange 48 of the wall thereof; and the numeral 49 designates a cover which forms a closure for the open side of the casing, said cover having an inturned peripheral flange 50 which fits closely about the casing adjacent the open side thereof, and slots at its top which fit over lugs 51 on the casing, to thereby hold the cover in proper position relative to the casing along the top and adjacent the open side of the latter. The lower edge of the cover 49 is fastened to the casing 45 by a swinging latch 52 adapted to be fastened to a lug 53 carried by the casing.

Secured to the casing 45 and extending along the same is a plate 54 adapted to support the usual license plate, the same being illuminated by light from the central lamp 26 passing through a transparent window 55 held in place relative to and extending along a slot or opening in the under side of, and extending along the lamp casing.

The side lamps 28 and 30 are surrounded by reflectors 57, 58 of parabolic form and which also act as shields to prevent light from the central lamp 26 from illuminating the "stop" signal 29, or showing through the clear glass closure 31 back of the backing lamp 30; these lamps being thus housed in chambers formed by the reflectors and isolated from the much larger central chamber within the lamp casing 45 between the lamp supporting plate 35 and the cover 49 which closes the open rear side of the lamp casing. The smaller ends of these reflectors surround the sockets 41, 42, and their larger rear ends are flanged as at 59 and the flanges secured to the flange 48 of the casing as by suitable rivets, to thereby hold the reflectors in place; suitable felt packing strips being interposed between the flanges 48 and 59, and between the flanges 59 and the adjacent inner surface of the rear cover or plate 49, to thereby more effectively prevent light rays emanating from the central lamp 26 from entering the side chambers within the reflectors and illuminating the stop or the clear glass signals. The lenses or glasses 27, 29 and 31 are held in place by split holding rings 61, 62, 63 of U-shaped cross section engaging said members and rearwardly extending undercut annular flanges which surround openings in the cover plate, which openings are closed by said lens and by the stop signal and clear glass plate, as will be understood.

Having thus described and explained our invention, we claim and desire to secure by Letters Patent of the United States:

1. In a device of the class described and in combination with a substantially triangular supporting member adapted to lie within a rim and tire to be supported, and having a horizontally arranged upper portion; a hollow lamp supporting bracket carried by said upper portion and depending therefrom, and having a substantially horizontal tubular socket at its lower end; a lamp structure having a substantially horizontal tubular neck adapted to fit within said socket; a plurality of lamps carried by said lamp structure; a connector located within said tubular socket; a plurality of supply conductors extending through said hollow bracket and to said connector; a second connector located within said tubular neck; and a plurality of supply conductors leading from said second connector to said several lamps.

2. In a device of the class described and in combination with a substantially triangular supporting member adapted to lie within a rim and tire to be supported, and having a horizontally arranged upper portion; a hollow lamp supporting bracket carried by said upper portion and depending therefrom, and having a substantially horizontal tubular socket at its lower end; a lamp structure having a substantially horizontal tubular neck adapted to fit within said socket; a plurality of lamps carried by said lamp structure; and a plurality of supply conductors extending through said hollow bracket and through said socket and neck and adapted to supply current to said several lamps.

3. In a device of the class described and in combination with a substantially triangular supporting member adapted to lie within a rim and tire to be supported, and having a horizontally arranged upper portion; a hollow lamp supporting bracket carried by said upper portion and depending therefrom, and having a substantially horizontal tubular socket at its lower end; a lamp structure having a substantially horizontal tubular neck adapted to fit within said socket; a plurality of lamps carried by said lamp structure; a plurality of supply conductors extending through said hollow bracket and through said socket and neck and adapted to supply current to said several lamps; and means located within said socket and neck for providing detachable connections between the portions of the supply conductors in said hollow bracket and the portions of said conductors within said lamp structure.

4. In a device of the class described and in combination with a supporting member adapted to lie within a rim and tire to be supported, a hollow lamp supporting bracket supported from the upper portion of said supporting member and depending therefrom; a lamp structure supported from said lamp supporting bracket; a plurality of lamps carried by said lamp structure; and a plurality of supply conductors extending through said hollow lamp supporting bracket and to said lamps and through which current is supplied thereto.

5. In a device of the class described and in combination with a supporting member adapted to lie within a rim and tire to be supported, a hollow lamp supporting bracket supported from the upper portion of said supporting member and depending therefrom, and having a socket at its lower end; a lamp structure having a neck adapted to engage said socket; a plurality of lamps carried by said lamp structure; and a plurality of supply conductors extending through said hollow lamp supporting bracket and to said lamps and through which current is supplied thereto.

6. In a device of the class described and in combination with a supporting member adapted to lie within a rim and tire to be supported, a hollow lamp supporting bracket supported from the upper portion of said supporting member and depending therefrom; a lamp structure supported from the lower end of said bracket; means carried by said bracket and said lamp structure and cooperating to provide a detachable hollow connection between said parts; and a supply conductor extending through said hollow bracket and through said hollow connector and to a lamp carried by said lamp structure.

7. In a device of the class described and in combination with a supporting member adapted to lie within a rim and tire to be supported, a hollow lamp supporting bracket supported from the upper portion of said supporting member and depending therefrom, and having a socket at its lower end; a lamp structure having a neck adapted to enter said socket; means for detachably fastening said neck in place within said socket; a supply conductor extending through said hollow bracket and through said socket and neck and to a lamp carried by said structure; and cooperating separable connectors included in said conductor and located within said socket and neck.

8. In a device of the class described and in combination with a substantially triangular supporting member adapted to lie within a rim and tire to be supported, and having a horizontally arranged upper portion; a lamp supporting bracket carried by said upper portion and depending therefrom; a lamp structure supported from the lower end of said lamp supporting bracket; a plurality of lamps carried by said lamp structure and arranged in substantially horizontal alignment; and a plurality of supply conductors through which current is supplied to said several lamps.

In testimony whereof we affix our signatures.

ERNEST W. SEAHOLM.
EWALD K. SCHADT.
GUY E. PARKER.